United States Patent [19]
Brekau et al.

[11] Patent Number: 5,458,812
[45] Date of Patent: Oct. 17, 1995

[54] PROCESS FOR THE PRODUCTION AND CONCENTRATION OF SILICA SOLS

[75] Inventors: Uwe Brekau, Cologne; Andreas Nickel, Wetter; Hans-Dieter Block, Leverkusen; Hans-Heinrich Moretto, Leverkusen; Peter Schmidt, Leverkusen; Peter Schober, Leverkusen; Werner Ludovici, Odenthal, all of Germany

[73] Assignee: Bayer Aktiengesellschaft, Leverkusen, Germany

[21] Appl. No.: 59,482

[22] Filed: May 10, 1993

[30] Foreign Application Priority Data

May 15, 1992 [DE] Germany .............. 42 16 119.3

[51] Int. Cl.$^6$ ..................... B01J 13/00
[52] U.S. Cl. ................ 252/313.2; 106/287.34
[58] Field of Search ............... 252/313.2, 314; 106/287.34; 423/333, 338, 339

[56] References Cited

U.S. PATENT DOCUMENTS

| | | | |
|---|---|---|---|
| 2,244,325 | 6/1941 | Bird | 252/313.2 |
| 2,574,902 | 11/1951 | Bechtold et al. | 252/313.2 |
| 3,440,175 | 4/1969 | Weldes et al. | 252/309 |
| 3,440,176 | 4/1969 | Sippel | 252/313.2 |
| 3,462,374 | 8/1969 | Klosak | 252/313.2 |
| 3,673,104 | 6/1972 | Albrecht | 252/313.2 |
| 3,947,376 | 3/1976 | Albrecht | 252/313.2 |
| 3,969,266 | 7/1976 | Iler | 252/313.2 |
| 4,336,234 | 1/1982 | Leutner et al. | 423/329 |
| 4,806,665 | 2/1989 | Jones et al. | 556/413 |
| 4,915,870 | 4/1990 | Jones | 252/313.2 |
| 5,352,277 | 10/1994 | Sasaki | 106/6 |

FOREIGN PATENT DOCUMENTS 1348705  3/1974  United Kingdom .

OTHER PUBLICATIONS

Shugar et al., *Chemical Technicians' Ready Reference Handbook*, Second Edition, (McGraw-Hill, Inc., NY, N.Y., 1981) pp. 316–317.

*Kirk–Othmer Encyclopedia of Chemical Technology*, Third Edition, vol. 15, pp. 115, (John Wiley & Sons, NY, N.Y., 1983).

D. K. Iler, "The Chemistry of Silica", Wiley, New York, (1979).

G. W. Sears, Jr., "Determination of Specific Surface . . . Sodium Hydroxide", Analytical Chemistry, vol. 28, No. 12, Dec. 1956, pp. 1981–1983.

Primary Examiner—Richard D. Lovering
Assistant Examiner—Daniel S. Metzmaier
Attorney, Agent, or Firm—William C. Gerstenzang; Sprung Horn Kramer & Woods

[57] ABSTRACT

Process for the production and concentration of alkaline silica sols containing nonaggregated, spherical $SiO_2$ particles with a diameter of $\geq 1$ nm starting with $SiO_2$ concentrations of 4–8% by weight, using microporous membrane filters.

9 Claims, No Drawings

PROCESS FOR THE PRODUCTION AND CONCENTRATION OF SILICA SOLS

This invention relates to a process for the production and concentration of alkaline silica sols containing nonaggregated spherical $SiO_2$ particles $\geq 4$ nm in diameter starting from $SiO_2$ concentrations of 4 to 8% by weight using microporous membrane filters.

Stable $SiO_2$-containing products in the form of sols, so-called silica sols, are required for many industrial applications, for example as high-temperature binders. The active ingredient of the product, $SiO_2$, must be present in a high concentration in the form of discrete, spherical non-aggregated particles. The advantage of such a product is obvious: transport and storage costs, for example, are inversely proportional to the $SiO_2$ concentration of the product.

Thus, U.S. Pat. No. 3,462,374 describes the production of a silica sol having an average particle diameter of 15 to 150 nm and an $SiO_2$ content of 45 to 55% by weight. In this process, water is evaporated from an aqueous alkaline solution under elevated pressure (472–9443 kPa), an acidic active silica sol containing particles having an average diameter below 5 nm being added at the same time to maintain a constant volume.

U.S. Pat. No. 3,440,176 describes a process for the production of silica sols having low occluded sodium and relatively high particle sizes. In this process, acidic fresh sol is added to a heel of an alkaline silica sol and a sodium silicate solution is added in such a quantity that the pH value is between 8.5 and 9.5. The silica sol is concentrated by evaporation of water.

U.S. Pat. No. 3,673,104 and U.S. Pat. No. 3,947,376 describe single-stage, discontinuous processes for the production of alkaline silica sols in preferably aqueous medium with an $SiO_2$ content of at least 35% by weight. The $SiO_2$ particles in the processes described in these documents have average particle diameters of 45 to 100 nm and are spherical and non-aggregated.

Silica sols produced by conventional methods known to the expert are normally concentrated by evaporation of water at the boiling temperature of the sol (U.S. Pat. No. 2,574,902, U.S. Pat. No. 3,440,175). However, the evaporation of water involves considerable energy consumption, particularly at boiling temperatures at atmospheric pressure, and is therefore economically unfavorable.

Accordingly, attempts have been made to concentrate silica sols by less energy-intensive processes, for example using microporous membrane filters which are also known as ultrafilters.

GB 1,348,705 describes a process for the production of silica sol from sodium silicate and an acid, the process steps of concentration (= removal of solvent) and removal of the salts present in the sol being carried out in a membrane filtration unit. In the membrane filtration process according to GB 1,348,705, the salt concentration has to be kept within narrow limits and, accordingly, has to be continuously monitored because the sol is in danger of solidifying if a certain salt concentration is exceeded. The need for a continuous supply of water and, hence, the increased removal of water by ultrafiltration and the use of relatively large membrane surfaces, the continuous monitoring of the salt concentration and the danger of the sol solidifying seriously handicap the process.

Accordingly, the problem addressed by the present invention was to provide a process which would enable silica sols to be produced and concentrated in an economically favorable and technically simple manner with minimal consumption of energy.

The present invention relates to a continuous process for the production of aqueous alkaline silica sols having a water content of 50 to 95% by weight, based on the weight of the sol, and containing non-aggregated spherical $SiO_2$ particles from an acidic fresh sol which contains 4 to 8% by weight of $SiO_2$ in the form of particles having an average particle diameter of 2 to 4 nm at a pH value of 2 to 4 and which is produced by mixing an alkali metal silicate solution with a cationic exchange resin in the H-form, in which said acidic fresh sol is added to a starting medium containing an aqueous, alkaline, colloidal silica sol solution with a pH value of $\geq 8$, a $SiO_2$ content of 2–14% by weight and an average particle size of 4–16 nm, alkaline agents are simultaneously added to this starting medium at temperatures of $\geq 60°$ C. and the quantity of alkaline agents added is such that the pH value does not fall below 8 during the whole process, and the addition of acidic fresh sol and alkaline agents is continued until the particles have an average diameter of $\geq 4$ nm and the aqueous, alkaline silica sols thus produced are then concentrated, and which is characterized in that A) the process of particle enlargement is carried out continuously in a multistage reaction cascade in which the first stage contains the starting medium and each subsequent reactor of the cascade is fed with overflow from the preceding reactor, and the acidic fresh sol is continuously introduced into the reactors and the alkaline agents are continuously introduced into the first reactor or the first reactors, and B) concentration is carried out by means of ultrafiltration in which an alkali-resistant membrane having a cutoff value of below 30,000, and preferably below 15,000 dalton, is used.

Preferably an alkaline sodium silicate solution, an alkaline potassium silicate solution, sodium hydroxide and potassium hydroxide are used as alkaline agents.

The ultrafiltration process is preferably carried out under a pressure of 3 to 30 bar and preferably 5 to 15 bar and at a temperature of 15° to 35° C. and preferably at room temperature.

Under the conditions mentioned above, the permeate flows are between 10 and 100 $l/m^2h$.

The $SiO_2$ recovery amounts to more than 99%.

Symmetrical or asymmetrical membranes—relative to the pore diameter—of homogeneous materials or of composite materials, so-called multilayer membranes, are preferably used.

The membranes preferably consist of organic polymer materials or of inorganic materials, preferably ceramic or graphite. The membranes preferably consist of organic polymer materials such as for example polyacrylonitrile, polysulfone, polyamide, polyaramid, polyether sulfone or of inorganic materials, preferably ceramic materials such as $SiO_2/Al_2O_3$ or graphite-containing materials such as graphite/$Al_2O_3$.

The particle size of the $SiO_2$ particles can be determined with an electron microscope. The average particle size D of the particles can also be calculated from the specific surface O, as determined in accordance with G. W. Sears (Analytical Chemistry, 28, 1956 (1981), in accordance with the following formula (cf. R. K. Iler, "The Chemistry of Silica", Wiley, N.Y., 1979):

$$D = \frac{6}{f * O} * 1000$$

where D is the average diameter of a surface distribution in nm, O is the specific surface in $m_2/g$ and f is the density of the $SiO_2$ particles. In the interests of simplification, the ideal density of amorphous $SiO_2$, i.e. 2.2 g/ml, may be used in the calculation.

The use of ultrafiltration technology for concentrating silica sols gives rise to a few system-specific problems, namely: the dilute silica sols used for ultrafiltration should only contain a small percentage of aggregated particles, so-called microgel. Relatively high microgel contents promote a relatively rapid increase in viscosity during the concentration process, so that the final concentration required may not be reached, instead the sol may solidify beforehand so that it becomes unuseable. High microgel contents interfere with the passage of water through the membrane and necessitate relatively frequent cleaning.

Production of the silica sol used for ultrafiltration by the claimed process ensures that no troublesome microgel contents will be present. Concentration of the silica sols to at least 30% by weight $SiO_2$ by the claimed filtration method can be carried out without interruption under pressures of 3 to 30 bar and preferably under pressures of 5 to 15 bar.

The membrane filter used for ultrafiltration is one of which the pores have such a diameter that water molecules and water-soluble salts are still able to pass through the pores while the colloidal $SiO_2$ particles present are just retained. If the membrane used has a smaller pore diameter, the colloidal silicon dioxide particles may still be retained, but higher and hence less advantageous pressures will be required for filtration to achieve similar filtration rates. Suitable membranes are those having cutoffs below 30,000 dalton and preferably below 15,000 dalton. The membranes used preferably consist of organic polymer material or inorganic materials, such as for example ceramic or graphite. Asymmetrical or symmetrical membranes of the same materials or multilayer membranes are preferably used for concentration in accordance with the invention.

The membranes suitable for concentrating the silica sols are used in commercially available modules, preferably in tube modules, in the process according to the invention. During the useful life of the membrane, deposits of silicon dioxide build up on the membrane surface. These deposits inhibit the permeate flow. The activity of the membrane can be regenerated by treatment with warm (approx. 50° C.) dilute alkali solution, preferably sodium hydroxide. Accordingly, long and economically advantageous useful lives can be achieved if the membranes and modules used are stable to alkalis.

The silica sol to be concentrated by ultrafiltration is circulated over the surface of the membrane. A turbulent flow is established over the membrane surface. These flow conditions counteract the polarization of concentration. Maintaining the turbulent flow conditions mentioned is particularly advantageous because the silicon dioxide present has a tendency to gel at relatively high concentrations which has an adverse effect on the membrane filtration process.

The pressure to be applied during the membrane filtration process should not be increased beyond a value at which an economically practicable permeate flow occurs because excessively high pressures promote the buildup of the relatively high $SiO_2$ concentrations mentioned in the vicinity of the membrane surface.

The filtration rate increases considerably with increasing temperature, although filtration of the alkaline silica sol at temperatures above 35° C. is less advantageous because this would result in permanent exposure of the membrane to the hot alkaline silica sol and would therefore be subjected to severe stressing. Satisfactory permeate flows of 10 to 100 $l/m^2h$ are actually achieved at temperatures of only 20° to 30° C.

The ultrafiltration process may even be carried out in a number of filters arranged in tandem.

The process of particle enlargement is carried out in a multistage reaction cascade, preferably consisting of at least three stages. Where three-stage reaction cascades are employed the stationary operating conditions in the individual reactors are preferably as follows:

Reactor 1
  pH value: 9.0–12.0
  average particle size: 4–20 nm
  average residence time: 10 mins –2h
  $SiO_2$ concentration: 2–15% by weight.

Reactor 2
  pH value: 8.5–11.0
  average particle size: 6–30 nm
  average residence time: 10 mins–2h
  $SiO_2$ concentration: 6–30% by weight Reactor 3
  pH value: 8.5–10.5
  average particle size: 9–55 nm
  average residence time: 4h –10h
  $Si_2O$ concentration: 7–50% by weight The concentrations are preferably obtained by evaporating off a quantity of water less than the added quantity.

The following examples illustrate the present invention but are not intended to limit its scope in any way.

EXAMPLE 1

Production

The apparatus used consists of three interconnected glass reactors arranged in tandem. The reactors 1 and 2 are designed as overflow reactors while reactor 3 has a bottom outlet. The volume of the reactors is measured at the boiling temperature up to the overflow and amounts to 783 ml for reactor 1 and 617 ml for reactor 2. The third reactor has a useful volume of 30 l.

The contents of each reaction vessel are mixed by a propeller stirrer and are indirectly heated by steam. To this end, steam-carrying metal coils of VA steel are arranged inside the reactors. The vapors are passed through a water cooler, condensed and then measured for reactor 2. Reactors 1 and 3 operate under reflux. The steam pressure of the heating steam with which the quantity of water to be distilled off from the individual reactors and hence the temperature are regulated is kept at a constant value by a suitable needle valve and a corresponding condensate separator.

The heating coils of the reactors are connected in parallel to a main steam pipe. Each of the reaction vessels described above is provided with its own condensate separator to enable fixed, varying quantities of water to be evaporated from each of the reactors and predetermined temperatures to be maintained.

A solution of acidic fresh sol prepared as described, for example, in U.S. Pat. No. 2,244,325 is introduced into the first reactor by means of a feeder. Similarly, the alkaline agent solution, such as for example metal hydroxide or metal silicate solution, preferably a sodium silicate solution, can be introduced into the first reactor by means of a metering unit.

To increase the stability in storage, i.e. the storage life of the acidic solution of the active silicate, the solution of fresh silica sol is cooled to temperatures of 4° to 10° C.

The steady-state conditions in the first two reactors can be maintained for an average residence time of 12 mins. in the first reactor and 14 mins. in the second reactor by addition of 3604 ml fresh silica sol containing 6% by weight $SiO_2$ per hour to the first reactor and 176 ml dilute alkaline soda waterglass solution per hour (containing 6% by weight $SiO_2$) to reactor 2. The temperature in the first reactor is 74° C., boiling temperature prevailing in the second and third reactors. 1116 ml water/hour are distilled off from the second reactor. When the third reactor is full, the silica sol flowing over from reactor 2 is introduced into another reactor of identical construction. The sol from reactor 3 is concentrated by ultrafiltration when a specific surface of 300 $m^2/g$ is reached.

In the steady-state operational condition of the continuous apparatus, specific pH values are established for all the reactors. The pH values are 9.2 in reactor 1, 9.5 in reactor 2 and 10 in reactor 3. The $SiO_2$ concentrations in the sols under steady-state conditions are 6% by weight in reactor 1 and 8% by weight in reactor 2. In reactor 3, the $SiO_2$ concentration is also 8% by weight.

The specific surface of the sol is 569 $m^2/g$ in reactor 1, 464 $m^2/g$ in reactor 2 and 300 $m^2/g$ in reactor 3.

The specific surface of the silica sol obtained under these conditions over a total of 80 hours was 300 $m^2/g$. The pH value was 10.0, the viscosity was 3.5 mPas at 20° C. and the $SiO_2$ concentration was 30% by weight.

To start up the reaction cascade, the first reactor is filled with the stored contents of the first reactor from the last period of operation.

By addition of the fresh sol and soda waterglass and by evaporation of the defined quantities of water, the steady-state operating conditions are established and the second reactor is filled by overflow. When the second reactor is full, the steady-state operating conditions are established therein and the following reactor is filled by overflow, etc.

Concentration

A silica sol having an $SiO_2$ concentration of 8% by weight and containing particles 5 to 20 nm in diameter is filtered through an ultrafilter with a filtration area of 44 $cm^2$ at a temperature of 25° C. The flow rate through the test cell is 500 l/h. Turbulent flow conditions are thus established. The average liquid pressure acting on the membrane was 10 bar. An Amafilter TZ filtration unit (manufacturer: Amafilter, Hannover) is used as the module.

An assymetrical membrane made up of organic polymer material with a cutoff of 3000 g/mol is used as the ultrafiltration membrane (this membrane is manufactured under the name of Desal G 20 by Desalination Systems Inc., Aarau). The permeate flow through the membrane is between 30 and 100 $l/m^2h$, depending on the concentration. After approx. 10 hours, the permeate flow through the membrane has reached a value which, very approximately, is linearly dependent on the concentration. After reaching an $SiO_2$ concentration of approx. 30% by weight, the module is operated for another 15 h with recycling of permeate. On completion of concentration, there is no further reduction in flow and the membrane operates under stable conditions.

On completion of the test, the pure water flow of the membrane is determined in the rinsed module. The result is in the region of the nominal value for the membrane.

The silica sol obtained had a viscosity of 3.5 mPas, as determined with a Höppler falling ball viscosimeter at 20° C. The pH value of the silica sol is 10. The product has a conductivity of 4.7 mS, the $Na_2O$ content in the solution is 0.34% by weight. The silica sol recovery by the Desal G 20 membrane is more than 99.5%.

Comparison Example 1

The silica sol produced in accordance with Example 1, $SiO_2$ content 8% by weight, is subjected to ultrafiltration at 25° C.

Concentration is carried out in an Amafilter TZ laboratory module (manufacturer: Amafilter, Hannover).

The ultrafilter has a filtration area of 44 $cm^2$. The flow rate across the test cell is 500 l/h.

The ultrafiltration membrane used is an asymmetrical membrane of organic polymer material with a cutoff of 0.100 micron (this membrane is manufactured under the name K 150 by Desalination Systems Inc., Aarau).

The separation efficiency of the membrane is inadequate, distinct quantities of colloidal $SiO_2$ entering the permeate.

We claim:

1. A continuous process for the production of aqueous, alkaline silica sols having a water content of 50 to 95% by weight, based on the weight of the sol, and containing nonaggregated, spherical $SiO_2$ particles, comprising:

A) producing an acidic fresh sol as a starting material, which contains 4 to 8% by weight of $SiO_2$ in the form of particles having an average diameter of 2 to 4 nm at a pH value of 2 to 4, by contacting an alkali metal silicate solution with a cation exchange resin in the H-form, and B1) adding said acidic fresh sol to a starting medium consisting of an aqueous, alkaline, colloidal silica sol solution having a pH value of $\geq 8$, a $SiO_2$ content of 2 to 14% by weight and an average particle size of 4 to 16 nm, and B2) simultaneously adding alkaline agents to said starting medium at temperatures of $\geq 60°$ C., whereby the quantity of alkaline agents added are such that the pH value does not fall below 8 during the whole process and whereby
   the addition of acidic fresh sol and alkaline agents to the starting medium being continued until the particles have an average diameter of $\geq 4$ nm, and c) then concentrating the aqueous, alkaline silica sol produced in B1) and B2), wherein
   the process of adding acidic fresh sol and alkaline agents to the starting medium under B1) and B2) is carried out continuously in a multistage reaction cascade so that stationary-operating states are established in the reactors of the multistage reaction cascade, and the first reactor of the cascade contains the starting medium, which is continuously reproduced in the course of the continuous process, and each subsequent reactor in the cascade is supplied with overflowing material from the preceding reactor so that the starting medium is formed in the second and the subsequent reactors of the cascade, which starting medium is continuously reproduced in the course of the continuous process, and fresh sol and alkaline agents can optionally be added to one or more of the reactors in said reactor cascade, and
   the product obtained from the reactor cascade is concentrated by ultrafiltration, for which an alkaline, stable membrane having a cutoff value of lower than 30,000 daltons is used.

2. A process as claimed in claim 1, wherein the alkaline agent is alkaline sodium silicate solution, alkaline potassium silicate solution, sodium hydroxide or potassium hydroxide.

3. A process as claimed in claim 1, wherein ultrafiltration is carried out under a pressure of 3 to 30 bar and at a temperature of 15° to 35° C.

4. A process as claimed in claim 3, wherein the ultrafiltration is carried out under a pressure of 5 to 15 bar and at room temperature.

5. A process as claimed in claim 1, wherein asymmetrical or symmetrical membranes of homogeneous materials or of composite materials are used for the ultrafiltration step.

6. A process as claimed in claim 1, wherein the alkali-stable membrane has a cutoff value below 15,000 dalton.

7. A process as claimed in claim 5, wherein the membranes comprise organic polymer materials or inorganic materials.

8. A process as claimed in claim 7, wherein the membranes comprise ceramic or graphite materials.

9. A process as claimed in claim 7, wherein the $SiO_2$ recovery from ultrafiltration is more than 99%.

* * * * *

UNITED STATES PATENT AND TRADEMARK OFFICE
CERTIFICATE OF CORRECTION

PATENT NO. : 5,458,812
DATED : October 17, 1995
INVENTOR(S) : Brekau, et al.

It is certified that error appears in the above-indentified patent and that said Letters Patent is hereby corrected as shown below:

Title Page     ABSTRACT: Line 4 delete " using " and substitute -- combining an acid sol formed by the cation exchanging an alkali metal silicate with an alkaline starting medium in a multistage reaction cascade followed by concentrating via --

Signed and Sealed this

Twentieth Day of February, 1996

Attest:

BRUCE LEHMAN

Attesting Officer     Commissioner of Patents and Trademarks